(12) United States Patent
Dudani et al.

(10) Patent No.: US 10,817,468 B2
(45) Date of Patent: Oct. 27, 2020

(54) DOCUMENT MANAGEMENT

(71) Applicant: ServiceNow, Inc., Santa Clara, CA (US)

(72) Inventors: Leena Gian Dudani, Sunnyvale, CA (US); Shaleen Shankar, San Diego, CA (US); Alexander James Richberg, San Diego, CA (US); Kenneth James Rudy Hamer, Ramona, CA (US); Lucinda Foss, San Francisco, CA (US); Regis Cridlig, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 345 days.

(21) Appl. No.: 15/906,635

(22) Filed: Feb. 27, 2018

(65) Prior Publication Data

US 2019/0266256 A1   Aug. 29, 2019

(51) Int. Cl.
| | |
|---|---|
| *G06F 7/00* | (2006.01) |
| *G06F 17/00* | (2019.01) |
| *G06F 16/11* | (2019.01) |
| *G06F 16/93* | (2019.01) |
| *G06F 16/16* | (2019.01) |

(52) U.S. Cl.
CPC .......... *G06F 16/125* (2019.01); *G06F 16/113* (2019.01); *G06F 16/162* (2019.01); *G06F 16/93* (2019.01)

(58) Field of Classification Search
CPC ......... G06F 17/30085; G06F 17/30073; G06F 17/30117; G06F 17/30011
USPC ........................................................ 707/663
See application file for complete search history.

(56) References Cited

U.S. PATENT DOCUMENTS

| | | |
|---|---|---|
| 6,678,887 B1 | 1/2004 | Hallman |
| 7,020,706 B2 | 3/2006 | Cates |
| 7,716,353 B2 | 5/2010 | Golovinsky |
| 7,769,718 B2 | 8/2010 | Murley |
| 7,925,981 B2 | 4/2011 | Pourheidari |
| 8,402,127 B2 | 3/2013 | Solin |
| 8,612,408 B2 | 12/2013 | Trinon |
| 8,788,463 B2 * | 7/2014 | Friesenhahn ........... G06F 16/93 707/662 |
| 8,832,652 B2 | 9/2014 | Mueller |
| 8,983,982 B2 | 3/2015 | Rangarajan |
| 9,098,322 B2 | 8/2015 | Apte |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,557,969 B2 | 1/2017 | Sharma |
| 9,645,833 B2 | 5/2017 | Mueller |

(Continued)

*Primary Examiner* — Binh V Ho
(74) *Attorney, Agent, or Firm* — Fletcher Yoder PC (57) ABSTRACT

Techniques relate to managing a document throughout its lifecycle according to configurable metadata associated with the document. A processor may receive the document in association with an operation and may determine suitable metadata, which may be configurable, to associate with the document. After the operation is closed, the processor may suitably handle the document based on the metadata. Handling the document may include moving the document to an associated profile and/or purging the document. Further, with the configurable metadata, the processor may control the document with increased granularity.

19 Claims, 9 Drawing Sheets

(56) References Cited

U.S. PATENT DOCUMENTS

| | | |
|---|---|---|
| 9,654,473 B2 | 5/2017 | Miller |
| 9,766,935 B2 | 9/2017 | Kelkar |
| 9,805,322 B2 | 10/2017 | Kelkar |
| 2002/0111835 A1* | 8/2002 | Hele ................. G06Q 40/08 705/4 |
| 2002/0169753 A1* | 11/2002 | Yoshimura ............ G06F 16/93 |
| 2009/0037520 A1* | 2/2009 | Loffredo ............. H04L 63/105 709/203 |
| 2009/0089315 A1* | 4/2009 | Jeffery .................. G06F 16/93 |
| 2009/0112670 A1* | 4/2009 | Black ................... G06Q 10/10 705/321 |
| 2010/0095349 A1* | 4/2010 | Motoyama ............ H04L 63/10 726/1 |
| 2011/0320230 A1* | 12/2011 | Podgurny ........ G06Q 10/06311 705/7.13 |
| 2012/0311426 A1* | 12/2012 | Desai .................. G06F 40/205 715/227 |
| 2013/0185240 A1* | 7/2013 | Ward .................... G06F 3/0486 706/47 |
| 2013/0263289 A1* | 10/2013 | Vijayan ................ G06F 16/128 726/31 |
| 2014/0351201 A1* | 11/2014 | Hobart ................. G06F 16/125 707/603 |
| 2015/0095430 A1* | 4/2015 | Kaushik ............... G06Q 10/101 709/206 |
| 2015/0120714 A1* | 4/2015 | Xu ..................... G06F 16/24578 707/723 |
| 2015/0227514 A1* | 8/2015 | Gillett ................. G06Q 10/101 707/608 |
| 2016/0224548 A1* | 8/2016 | Massand .................. G06F 16/93 |
| 2017/0024696 A1* | 1/2017 | Baessler ................. G06F 16/93 |
| 2017/0109391 A1* | 4/2017 | Rosen ................ G06Q 10/1093 |
| 2017/0193454 A1* | 7/2017 | Rotolo ............... G06Q 10/1053 |
| 2017/0344540 A1* | 11/2017 | Pidduck ................. G06F 16/93 |
| 2018/0088825 A1* | 3/2018 | Mutha ................. G06F 11/3409 |
| 2018/0276232 A1* | 9/2018 | Dhanasekaran ...... G06F 3/0605 |

\* cited by examiner

☑ EMPLOYEE DOCUMENT

*DOCUMENT | EMPLOYMENT VERIFICATION LETTER.DOCX [VIEW] [RENAME] [REMOVE]

DESCRIPTION |

*EMPLOYEE | GALE NOLAU ✕ ▾ | FILE SIZE | 23KB

*DOCUMENT TYPE | EMPLOYMENT VERIFICATION ✕ ▾ | FILE FORMAT | application/vnd.openxmlformats-officedocu

HR CASE | SEARCH FOR A HR CASE ▾ | CREATED ON | 2018-02-07 17:28:57

TAGS | ADD TAG... | CREATED BY | ADMIN

[CANCEL] [SUBMIT]

*(Figure 7: HR Employee Relations Case screen, reference 700, showing fields including Number HRC0001039, Opened For: Beth Anglin, Subject Person: Gale Nolau, HR Service: Disciplinary Issue, Warning Type: Written Warning, Warning Date: 2018-02-05, Skills: Employee Relations, Short Description: Disciplinary Issue, State: Work In Progress, Priority: 4-Low, Source: -None-, Opened: 2018-02-07 08:49:30, Opened By: Oliver Johnson, Assigned To: Oliver Johnson. Manage Attachments (3): Warning_Letter.pdf, Disciplinary_Action_Form.pdf, Employee_Statements.pdf — labeled 404, 406/704, 702, 706.)*

| ☑ | ≡ RETENTION PERIOD<br>END DATE + 5 YEARS | | | 🖉 ⋀ ⇅ ⋯ [UPDATE] [DELETE] |
|---|---|---|---|---|
| | DESCRIPTION | END DATE+5 YEARS | | |
| | TABLE | HR PROFILE [sn_hr_core_profile] ▼ | DATE OFFSET TYPE | AFTER ◂▸ |
| | *DATE FIELD | EMPLOYMENT END DATE ▼ | DATE OFFSET UNITS | YEARS ◂▸ |
| | | | DATE OFFSET QUANTITY | 5 |
| [UPDATE] [DELETE] | | | | |

DOCUMENT MANAGEMENT

BACKGROUND

The present disclosure relates generally to document management. More particularly, the present disclosure relates to receiving, handling, and purging a document according to information associated with the document.

This section is intended to introduce the reader to various aspects of art that may be related to aspects of the present disclosure, which are described and/or claimed below. This discussion is believed to be helpful in providing the reader with background information to facilitate a better understanding of the present disclosure. Accordingly, it should be understood that these statements are to be read in this light, and not as admissions of prior art.

In order to complete an operation (e.g., a case, a task, a process, and/or the like), an enterprise may generate and/or receive a number of documents associated with the operation. However, these documents may be received in a number of different locations, and different processing (e.g., management) instructions may respectively correspond to each document. For example, in the context of human resources, an employee onboarding operation may involve the collection and handling of several documents (e.g., employee eligibility verification, offer letter, salary agreements, and/or the like) related to hiring an employee. These documents may be received via upload to a portal (e.g., a website), from an email to a human resources representative, and/or from a fax, from the same or different locations. Further, policies may dictate that the enterprise retain each of the documents for a different duration (e.g., until five years after the employee leaves the enterprise). As such, as the number of operations performed by the enterprise and/or the number of documents received by the enterprise increases, suitably receiving and handling each document may become increasingly cumbersome.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An enterprise may receive and/or handle a number of documents (e.g., files) related to an operation (e.g., a case, a task, and/or the like) for each of a set of operations. In some cases, for example, a document may be needed to complete an operation or a process involved with the operation. Thus, to facilitate efficiently receiving a document, the enterprise may utilize a document management portal (e.g., a user interface and/or a website) capable of generating and/or receiving (such as via an upload of the document) the document in association with a suitable operation.

After generating and/or receiving the document, the document management portal may handle the document for the document's lifetime. Because each document in the document management portal may have different customizable metadata (e.g., data about the document itself as opposed to its content) associated with it, such as a duration (e.g., five years) to maintain the document in the document management portal, handling the document may include facilitating configuration of metadata associated with the document and may include determining suitable actions to perform on the document according to the metadata associated with the document. In some embodiments, an operation may be associated with a profile (e.g., an account or personnel profile), which may correspond to a record, a folder or a group of folders, among other things, capable of storing information related to the profile. Accordingly, a suitable action to perform on a document may include moving (e.g., relocating and/or copying) the document into the profile or a sub-folder of the profile.

Further, when the duration to maintain the document in the document management portal has elapsed, the document management portal may purge the document from the document management portal in accordance with established document retention policies. Purging the document may include deleting the document, moving the document to an internal and/or an external archive, maintaining a log (e.g., a record) of the document and its purge in the document management portal, and/or the like. More specifically, the process involved with purging the document may depend on the metadata associated with the document.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

With the preceding in mind, techniques described below may be implemented via one or more processors of a computing device and/or a computing framework. Accordingly, the one or more processors and/or the computing framework implementing the disclosed techniques may increase the efficiency with which documents are managed. In some embodiments, the techniques may reduce the amount of time and/or resources involved with receiving and/or managing a document. For example, by including suitable metadata related to a document, the one or more processors and/or the computing framework may more rapidly determine a suitable action to perform on the document than if the metadata was associated remotely from the document and/or across several locations. Further, by including configurable metadata, the one or more processors and/or the computing framework may perform operations related to the document with increased granularity. Additionally, the one or more processors and/or the computing system may more reliably purge (e.g., dispose) documents by maintaining metadata specific to purging the document with the document itself.

Figure 1:
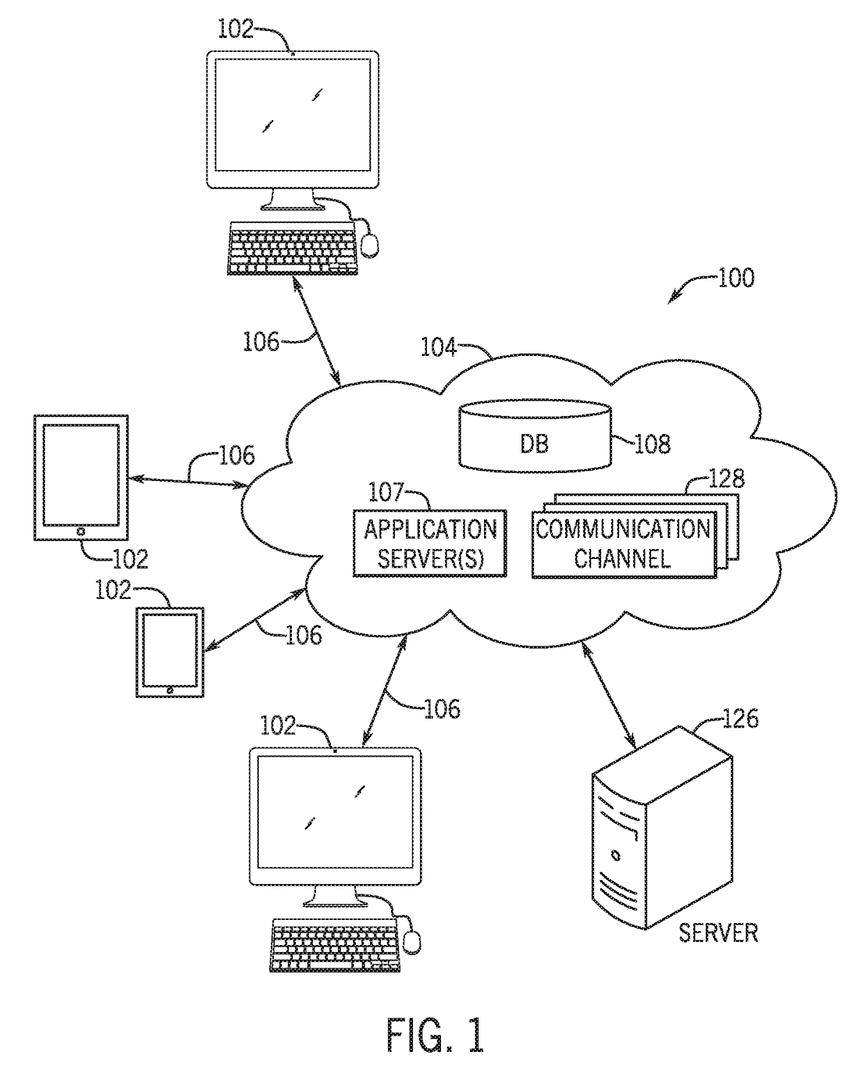
FIG. 1 is a block diagram of a distributed computing system utilizing a platform and a database (DB), in accordance with an embodiment.

By way of introduction to the present concepts and to provide context for the examples discussed herein, FIG. 1 is a block diagram of a system 100 that utilizes distributed computing and that may be used in conjunction with the approaches discussed herein. As illustrated, one or more clients 102 communicate with a platform (e.g., a cloud service) 104 over a communication channel 106. Each client device 102 may include any suitable computing system. For instance, the client device 102 may include one or more computing devices, such as a mobile phone, a tablet computer, a laptop computer, a notebook computer, a desktop computer, or any other suitable computing device or combination of computing devices. Each client device 102 may include client application programs running on the computing devices. Each client device 102 can be implemented using a single physical unit or a combination of physical units (e.g., distributed computing) running one or more client application programs. Furthermore, in some embodiments, a single physical unit (e.g., server) may run multiple client application programs simultaneously.

The platform (e.g., cloud service) 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client device 102 and the platform 104. The communication channel 106 may incorporate local area networks (LANs), wide area networks (WANs), virtual private networks (VPNs), cellular networks (e.g., long term evolution networks), and/or other network types for transferring data between the client device 102 and the platform 104. For example, the communication channel 106 may include an Internet connection when the client device 102 is not on a local network common with the platform (e.g., cloud service) 104. Additionally or alternatively, the communication channel 106 may include network connection sections when the client and the cloud service 104 are on different networks or entirely using network connections when the client device 102 and the cloud service 104 share a common network. Although only four clients 102 are shown connected to the platform 104 in the depicted example, it should be noted that platform 104 may connect to any number of clients 102 (e.g., tens, hundreds, or thousands of clients 102).

Through the platform 104, the client device 102 may connect to various devices with various functionality, such as gateways, routers, load balancers, databases, application servers running application programs on one or more nodes, or other devices that may be accessed via the platform 104. For example, the client device 102 may connect to an application server 107 and/or a database (DB) 108 via the platform 104. The application server 107 may include any computing system, such as a desktop computer, laptop computer, server computer, and/or any other computing device capable of providing functionality from an application program to the client device 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the DB 108). For example, the DB 108 may store tables of information (e.g., content, content types, user permissions, user profile data, user subscription data, notification preferences, etc.).

Additional to or in place of the DB 108, the platform 104 may include one or more other database servers. The database servers are configured to store, manage, or otherwise provide data for delivering services to the client device 102 over the communication channel 106. The database server includes one or more databases (e.g., DB 108) that are accessible by the application server 107, the client device 102, and/or other devices external to the databases. The databases may be implemented and/or managed using any suitable implementations, such as a relational database management system (RDBMS), an object database, an extensible markup language (XML) database, a configuration management database (DB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

Access to the platform 104 is enabled via a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

The communication channel 128 may be a database table that is typically queried, updated, and inserted into by other systems. In such an implementation, each record in the communication channel 128 is a message from an instance in the platform 104 to a system (e.g., server 126) external to the platform 104 that connects to the platform 104 or a specific instance running in the platform 104 or a message to the instance from the external system. The fields of a communication channel 128 record include various data about the external system or the message in the record.

Figure 2:
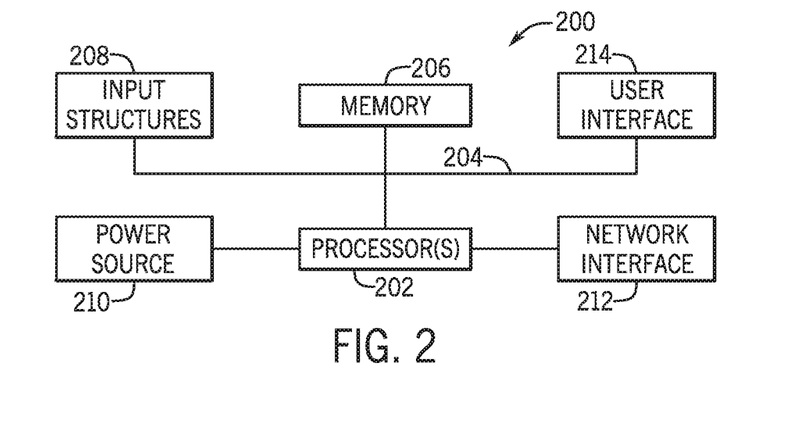
FIG. 2 is a block diagram of a computing device utilized in the distributed computing system of FIG. 1, in accordance with an embodiment.

FIG. 2 generally illustrates a block diagram of an embodiment of an internal configuration of a computing device 200, such as a computing device suitable for accessing and managing documents as discussed herein. With respect to FIGS. 1 and 2, the computing device 200 may be an embodiment of the client device 102, the application server 107, a database server (e.g., DB 108), other servers in the platform 104 (e.g., server hosting the communication channel 128), and/or a device running the server 126. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more buses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors 202 may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more buses 204 includes suitable electrical channels to provide data and/or power between the various components of the computing device. For example, the one or more buses 204 may include a power bus from the power source 210 to the various components of the computing device. Additionally, in some embodiments, the one or more buses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more buses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more buses 204. The input structures 208 may alternative or additionally include other input devices. For example, the input structures 208 may include sensors or detectors that monitor the computing device 200 or an environment around the computing device 200.

The power source 210 can be any suitable source for power of the various components of the computing device 200. For example, the power source 210 may include line power and/or a battery source to provide power to the various components of the computing device 200 via the one or more buses 204.

The network interface 212 is also coupled to the processor 202 via the one or more buses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

As described in detail below, a document management portal may be generated. The document management portal may be accessed via the user interface 214 (e.g., a display), which may display an interface through which a document (e.g., a file) may be uploaded and/or handled for storage in memory 206 and/or within the database 108. The document management portal may then perform one or more suitable actions on (e.g., handle) the document throughout the document's lifetime, according to customizable metadata (e.g., information) associated with the document.

Figure 3:
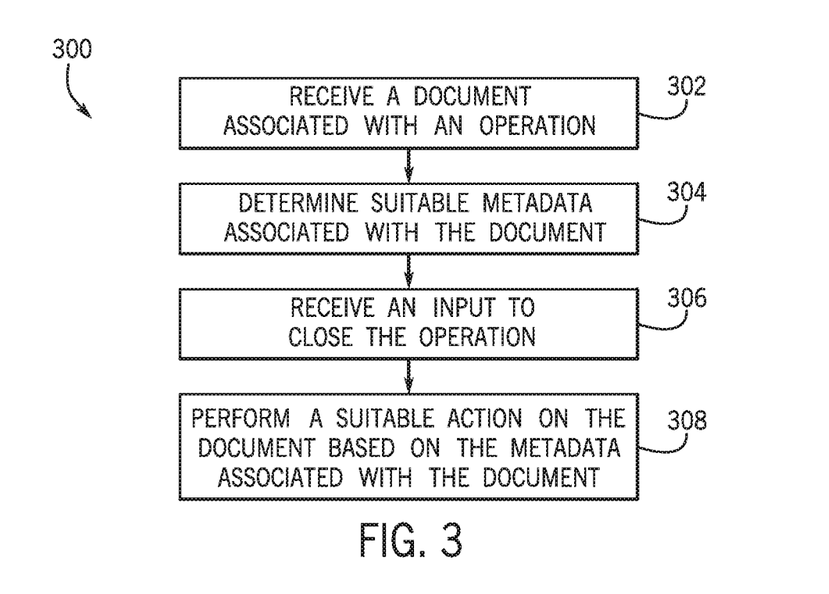
FIG. 3 is a flow diagram of a method to manage a document, in accordance with an embodiment.

With the foregoing in mind, FIG. 3 illustrates a flow chart of a method 300 for handling a document using the document management portal, in accordance with embodiments described herein. Although the following description of the method 300 is described in a particular order, which represents a particular embodiment, it should be noted that the method 300 may be performed in any suitable order. Further, certain steps may be skipped altogether, and additional steps may be included in the method 300. Moreover, the method 300 may be performed on the one or more processors 202 of one or more computing devices 200 of the client device 102, the platform 104, the MID server 126, or any suitable combination.

In any case, to initiate the method 300, a document may be received that is associated with an operation (process block 302), such as (in a human resources context) a recruiting operation, an on-boarding operation, a promotion or reassignment operation, a disciplinary operation, and so forth. The document may be received from a user (e.g., a computing device 200 of the client device 102) and/or from another computing device 200 via the document management portal. Additionally or alternatively, to receive the document, the document may be generated within the document portal. Further, the document management portal may facilitate interaction with the operation, such as creation of, updates to, and fulfillment of the operation, via the user interface 214. As such, in some embodiments, the user interface 214 may include an operation page (e.g., interface) to individually or collectively select or edit an operation or a set of operations, respectively. Accordingly, in some embodiments, receiving a document associated with an operation may involve a user and/or a computing device 200 uploading the document to a respective page associated with that operation.

After receiving the document, the metadata associated with and/or to associate with the document may be determined (process block 304). Metadata may include information, such as a description, a file size, a file format, a date of creation, an author, and/or the like, that may relate to a document. Such metadata may be associated with a document prior to its receipt in the document management portal. That is, for example, metadata may be associated with the document external to the document management portal. In some embodiments, however, additional examples (e.g., categories) of metadata, such as the associated operation, a document type, user access permissions, a retention policy, a security policy, and/or legal hold data, among other things, may be determined and associated with the document after the document is received (process block 302). In any case, the metadata associated with the document may identify the document and characteristics of the document and may facilitate easier searches and/or filtering of documents based on the information included in the metadata.

In some cases, metadata, such as the additional examples described above, may be associated with the document based on an input received from a user and/or computing device 200. That is, for example, a user may select the document type associated with the document via the document management portal. Further, each category (e.g., type) of metadata may include inherent metadata that may be associated with the document without explicit input to do so. As such, the document may inherit metadata through associations with specific categories of metadata. For example, by associating the document with a particular operation during upload, metadata associated with the operation may be associated with the document. Accordingly, the user access permissions and/or the retention policy associated with the operation may be associated with the document if an input regarding the user access permissions and/or retention policy is not received. In cases that an input regarding inherent metadata, such as the user access permissions and/or the retention policy associated with the operation, is received, the inherited metadata settings may be overridden with those included in the input. Further, as discussed in greater detail below, additional inherited metadata associated with a document may include a purge authorization and/or a sharing policy.

Additionally or alternatively, suitable metadata may automatically be associated with a document. In some embodiments, for example, the document management portal may determine metadata to associate with the document based on a format (e.g., file format) of the document, contents included in the document, such as headings, descriptions, and/or the like, and/or a title of the document, among other things. Accordingly, metadata that is not specified in an input (e.g., a user input) nor inherited from existing metadata associated with a document may be associated with the document.

An input to close (e.g., cancel and/or complete) the operation associated with the document may then be received (process block 306). In some embodiments, the user may fulfill and/or end the operation via the document management portal. Additionally or alternatively, the computing device 200 may provide an input to the document management portal to advance the operation towards completion, and completion of the operation may be detected. In any case, to complete the operation or to cancel the operation (e.g., mark the operation inactive regardless of whether it is completed), the user and/or the computing device 200 may transmit an input to the document management portal to do so.

In some embodiments, in response to receiving an input to close the operation, a suitable action may be performed on the document (process block 308). The suitable action may be determined based on the metadata associated with the document. A suitable action for the document may include moving the document to a profile (e.g., a user or personnel profile), which may be stored in the database 108 and/or memory 206. In such cases, as will be described in further detail, the user may securely share the document from the profile with another user and/or computing device 200 according to a set of permissions included in the metadata of the document.

Another suitable action may include purging the document from the document management system after a certain duration (e.g., a month, a year, five years, or a set number of months and/or years after an event), which may be determined based on the metadata. As will be described in further detail, purging the document from the document management system may involve deleting the document from the database 108 and/or memory 206 and maintaining a log (e.g., a history) of the document's purge, among other things. Further, prior to purging the document, the metadata associated with the document may determine a suitable authorization process to be completed by a user and/or a computing device 200, and/or the metadata may determine whether any holds (e.g., blocks) on the purging process are in place for the document.

As an illustrative example, the method 300 is described below in the context of the document management portal implemented for a human resources enterprise. However, while the descriptions herein use the human resources as an illustrative example, the document management portal and the method 300 may be utilized in any suitable application and/or by any suitable enterprise. For example, in some embodiments, the method 300 and the document management portal may be implemented within a legal enterprise, within an accounting enterprise, and/or in order to maintain documents and/or processes involved with vendors and/or customers, among other applications.

Figure 4:
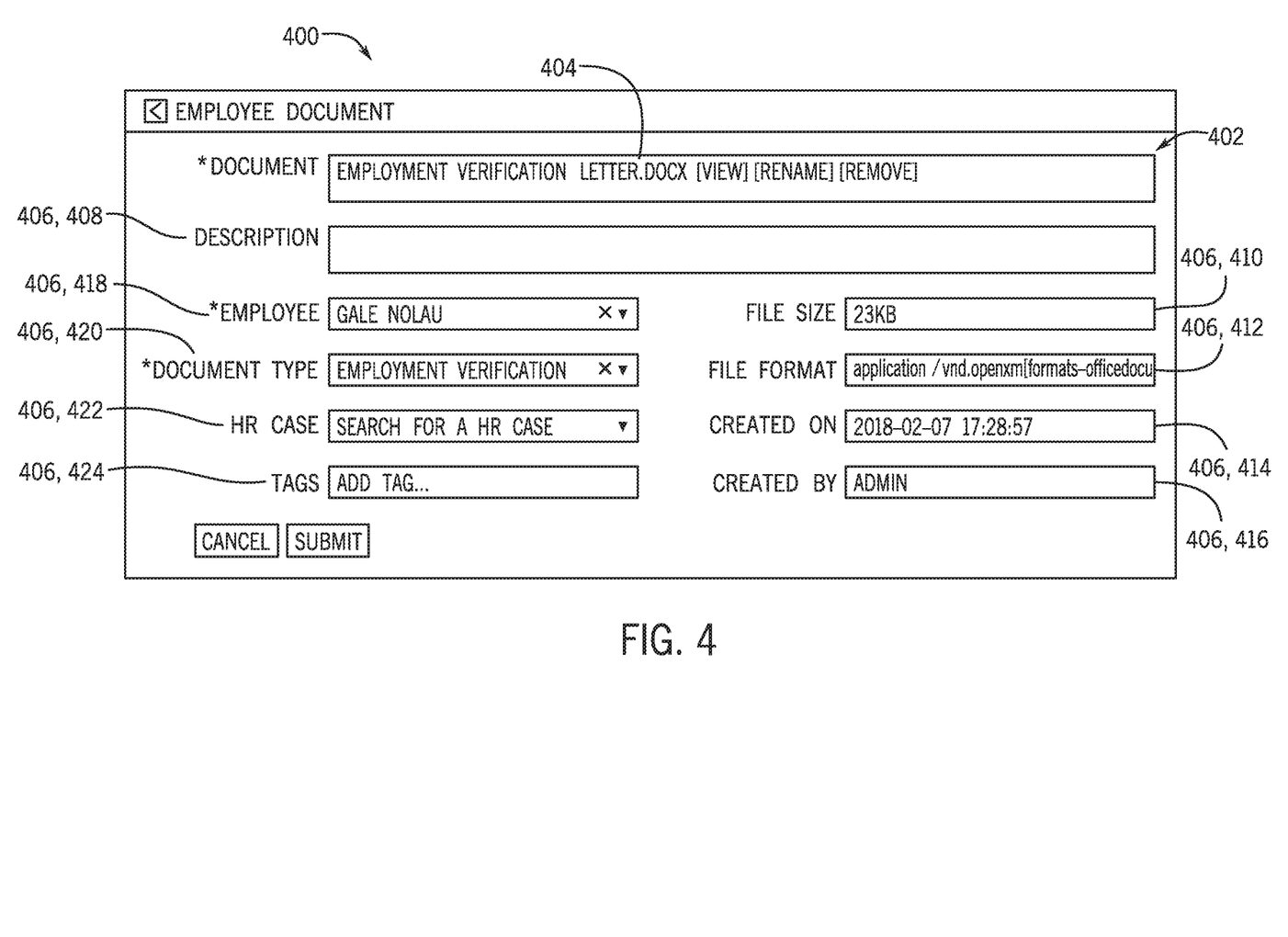
FIG. 4 is a screenshot of a user interface to upload a document, in accordance with an embodiment.

Turning now to FIG. 4, a screenshot of a user interface 400 of a document upload page 402 is illustrated. The document upload page 402 may be used by a user and/or a computing device 200 to add a document (e.g., a file) to the document management portal described above (process block 302). The document upload page 402 may include one or more of fields, drop downs, attachment selectors, or lists, to receive inputs of selections from a user, the computing device 200, or another computing device. The inputs may relate to a document 404 selected as an attachment for uploading to the user portal and/or may relate to metadata 406 (e.g., descriptions and/or tags) to associate with the document 404. The metadata 406 may include information, such as a description 408, a file size 410, a file format 412, a date of creation (e.g., created date) 414, an author (e.g., created by) 416, and/or the like, associated with and/or to associate with the document 404. Further, in an example of the document upload page 402, such as within a human resources application, the metadata 406 may include information associated with an employee (e.g., employee identification 418), a document type 420, a human resources (HR) case 422, one or more tags 424, and/or the like associated with the document 404.

Figure 5:
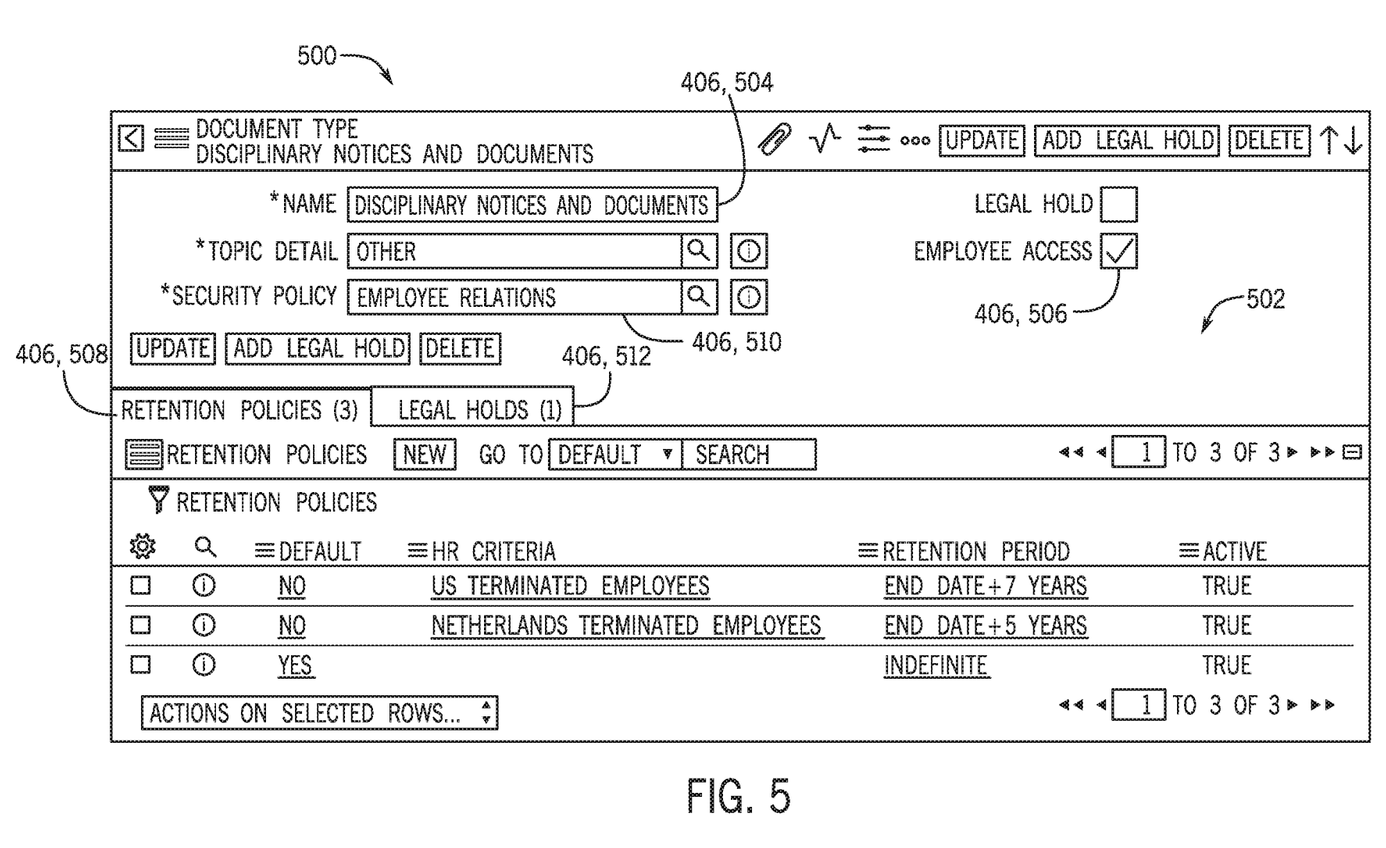
FIG. 5 is a screenshot of a user interface to configure metadata associated with a document type, which may be associated with the uploaded document, in accordance with an embodiment.

In some embodiments, as illustrated in FIG. 5, associating a document type 420 to the document 404 may result in secondary (e.g., inherited) information, such as a document type name 504, employee (e.g., user) access permissions 506, a retention policy 508, a security policy 510, legal hold data 512, being included in the metadata 406. The document type name 504 may identify a category (e.g., type) of documents relevant to the document 404. The employee (e.g., user) access permissions 506 may be used to restrict use and/or direct access to the document 404 to a specific set of users. The retention policy 508 may include information regarding how long the document 404 may be maintained in the document management portal before it is purged. In some embodiments, the retention policy 508 may be based on one or both of a user (e.g., HR) criteria and a retention period, as will be described in further detail. The security policy 510 may include details regarding sensitivity of information included in the document 404 and/or how the information may be properly handled, and legal hold data 512 may relate to a block and/or a history of blocks placed on the document 404 for legal purposes to prevent it from being purged. Further, while not shown, the document type 420 may result in a purge authorization, which may specify a user to authorize a purge and/or whether the user is required to do so, and/or a sharing policy, which may detail whether and/or how a user may share a document with additional users, to be associated with the document 404.

The one or more processors 202, for example, may execute code or routines that utilize information (e.g., metadata) associated with the document 404 to determine a suitable action to perform on the document 404 after it is successfully uploaded to the document management portal. Further, as illustrated in a screenshot of a user interface 500, the document management portal may include a document type configuration page 502 to configure the inherited information resulting from a document type. The document type configuration page 502 may provide input fields that may update the inherited information (e.g., metadata 406) based in part on selections to the input fields.

Figure 6:
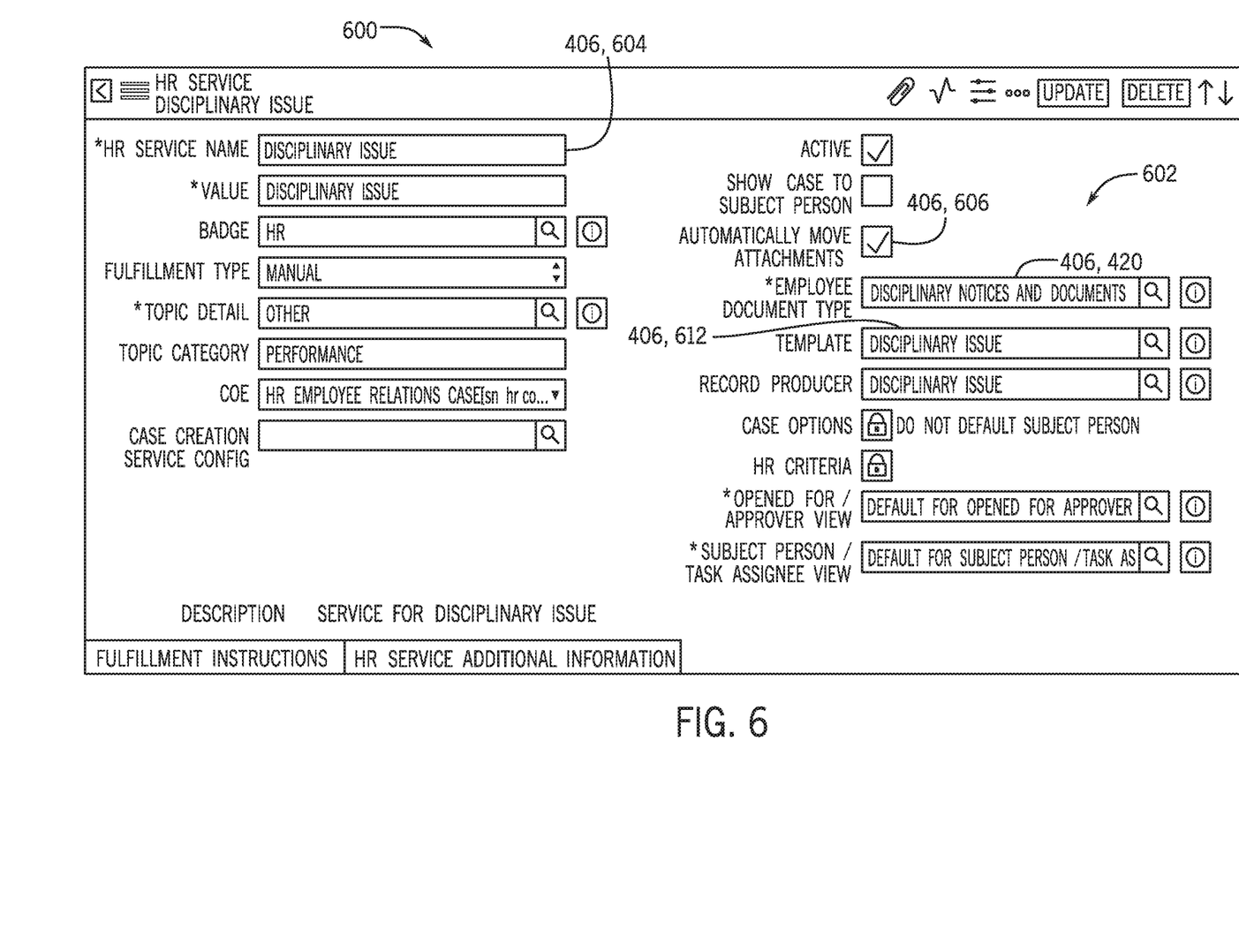
FIG. 6 is a screenshot of a user interface to configure metadata associated with an operation type, which may be associated with the uploaded document, in accordance with an embodiment.

Further, as described with reference to FIG. 4, the document 404 may be associated with (e.g., assigned to) a type of HR case (e.g., an operation). Examples of an HR case type may include a new employee onboarding, a disciplinary issue, an employee exit case, and/or the like. In this example related to HR case type, an operation or activity to be performed that may involve various HR related tasks or sub-tasks, some or all of which relate to one or more of the documents associated with the operation (e.g., a disciplinary referral, an offer letter, a resignation letter, and so forth). Turning to FIG. 6, an HR case type selected to be associated with the document 404 may determine tertiary (e.g., inherited) information, such as an HR case type name 604 and whether the document 404 will be automatically moved to a profile and/or another location in the document management portal (e.g., automatically move attachments 606), included in the metadata, as will be described in further detail. As such, as illustrated in the screenshot of a user interface 600, an HR case type configuration page 602 may be included in the document management portal. The HR case type configuration page 602 may allow a user and/or the computing device 200 to modify (e.g., add, update, and/or delete) metadata 406, resulting from the association of the document 404 and the selected HR case type, to be associated with the document 404. To do so, the user and/or the computing device 200 may input selections to the input fields included in the HR case type configuration page 602.

Further, in some embodiments, the type of HR (e.g., type of operation) case may dictate a set of suitable documents (e.g., a checklist) and/or document types 420 to associate with the HR case 422 (e.g., an operation). The set of suitable documents and/or document types 420 may be configured via the HR case type configuration page 602. As such, according to the HR case type, an HR case 422 may automatically populate with the suitable documents and/or document types 420, which may be stored in the document management portal as templates 612. Additionally or alternatively, which of the set of suitable documents and/or document types 420 to be associated with the HR case 422 are missing may be determined as a user (e.g., an HR representative and/or an employee) interacts with the HR case 422. Further, documents 404 and/or document types 420 that are not included in the set of suitable documents and/or document types 420 may be identified.

Figure 7:
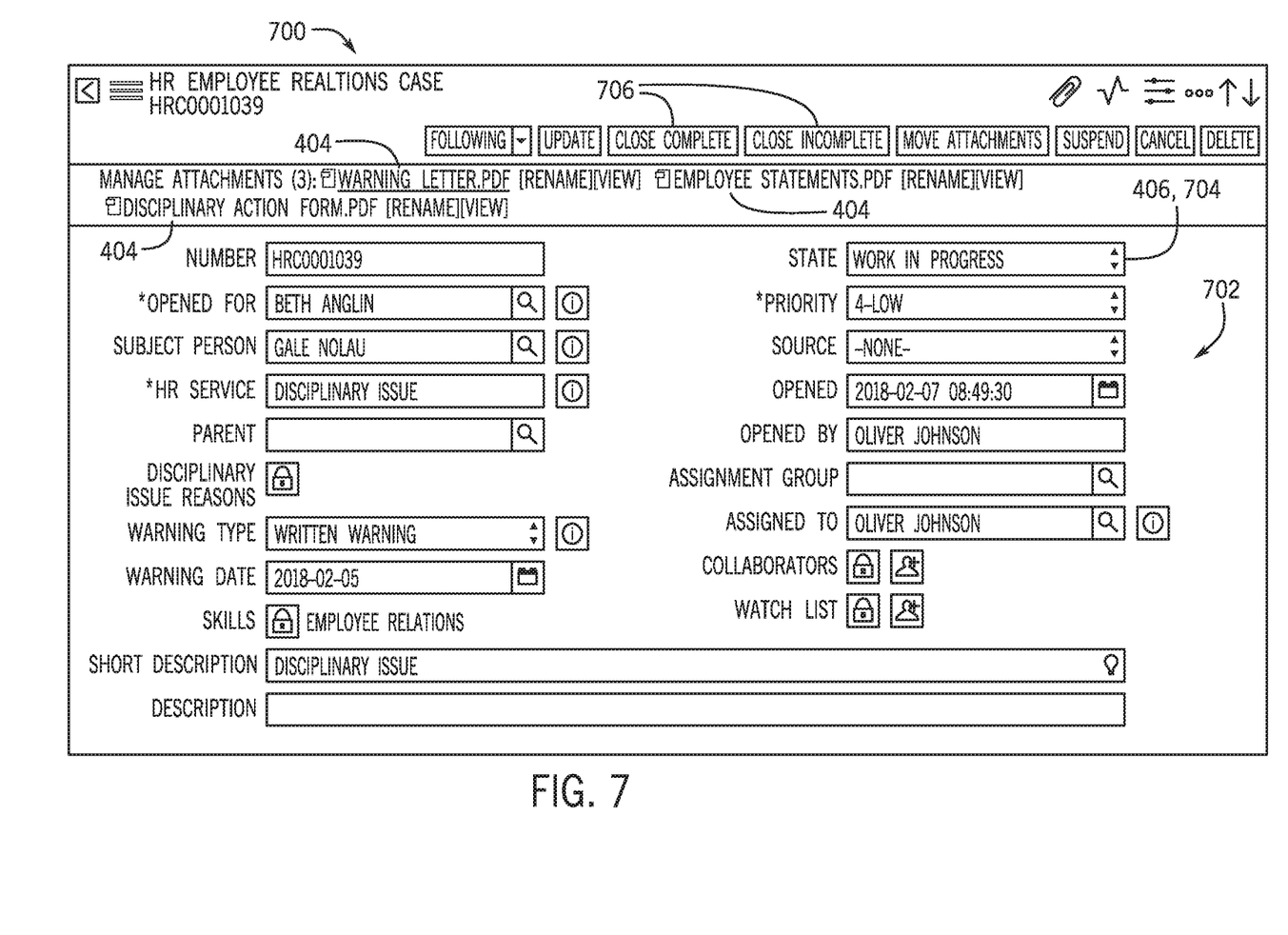
FIG. 7 is a screenshot of a user interface to work on an operation having the uploaded document, in accordance with an embodiment.

An uploaded document 404 associated with an HR case 422 may be viewed, as illustrated in the screenshot of a user interface 700 in FIG. 7, in an HR case fulfilment page 702. Accordingly, a human resources representative (e.g., an administrative user) and/or an employee may interact with the HR fulfillment page 702 to satisfy an operation, such as the examples described above. As such, the HR fulfillment page 702 page may include one or more of fields, drop downs, attachment selectors, or lists, to receive inputs of selections from a user, the computing device 200, or another computing device, as described with reference to the document upload page 402, the document type configuration page 502, and the HR case type configuration page 602. In some embodiments, the HR case fulfillment page 702 may include a state field 704 that may reflect a status of the HR case 422. Examples of an HR status case may include "ready", "work in progress", "suspended", and "closed" (e.g., complete and/or cancelled), among other things, and the state field 704 may update to indicate such statuses after receiving an input from the user (e.g., an HR representative and/or an employee) and/or a computing device 200. The input may be received at the HR fulfillment page 702 and/or may be received from an additional page (e.g., the document upload page 402, the document type configuration page 502, and/or the HR case type configuration page 602) related to the document 404 and/or the operation.

Through a suitable combination of inputs received via the document upload page 402, the document type configuration page 502, the HR case type configuration page 602, and/or the HR fulfillment page 702, the suitable metadata 306, whether inherited or directly specified, to associate with the document 404 may be determined (process block 304). However, the pages (402, 502, 602, and 702) described herein and the metadata 306 configurable via these pages (402, 502, 602, and 702) is intended to be illustrative, and not limiting. As such, suitable metadata 306 may include any number of types of information and/or may be configured via any suitable interface.

Further, an input to close (e.g., complete and/or cancel) the HR case 422 (e.g., operation) may be received via the HR fulfillment page 702 (process block 306). That is, for example, a user and/or a computing device 200 may provide information to each of a number of required data fields associated with the HR case 422 in order to complete the case. Additionally or alternatively, the user may select a close operation input button 706 to close the HR case 422. The state field 704 may then automatically update to mark the HR case 422 as complete (e.g., closed), or the user and/or the computing device 200 may provide an input to change the status of the state field 704. In other cases, the status reflected in the state field 704 may be updated to indicate that the HR case 422 is closed when an input (e.g., a request) to cancel the HR case 422 is received via the HR fulfillment page 702. An HR case 422 may be cancelled when, for example, an HR representative no longer plans on completing the HR case 422, such as when the HR case 422 was initialized accidentally.

After receiving the input to close the HR case 422, a suitable action may be determined and performed on the document 404 based at least in part on the metadata 406 associated with the document (process block 308). In some embodiments, a suitable action to perform on the document 404 may involve automatically moving the document 404 to a user (e.g., an employee) profile. An additional suitable action to perform on the document 404 may involve purging the document 404 from the document management portal.

Figure 8:
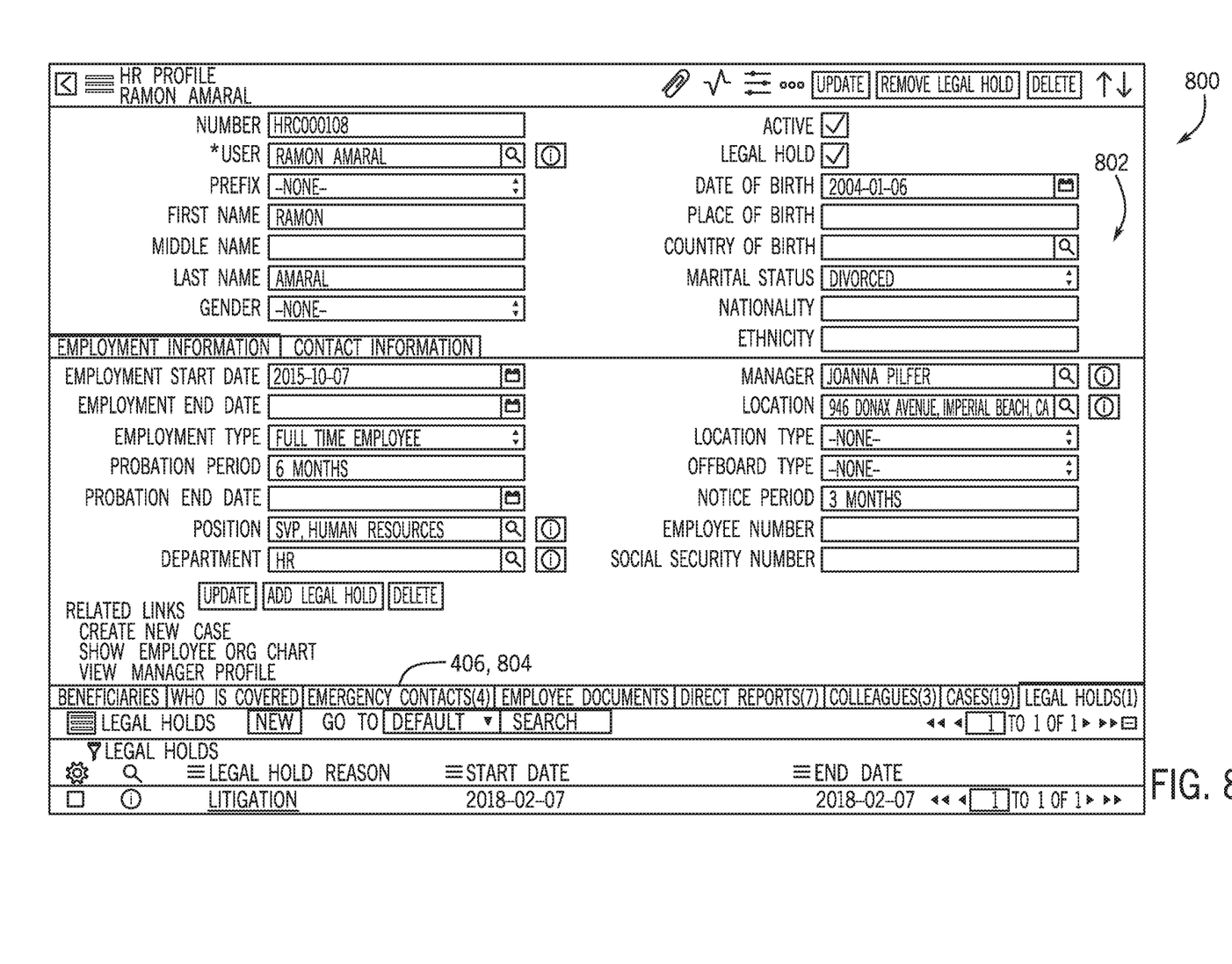
FIG. 8 is a screenshot of a user interface to view and/or configure a profile, in accordance with an embodiment.

Turning to FIG. 8, as illustrated in a screenshot of a user interface 800, a profile page 802 may allow a user, such as an employee or an HR representative, to view and/or edit a profile (e.g., a user profile). The profile page 802 may include one or more input fields, drop downs, or lists, to receive inputs of selections from a user, the computing device 200. Further, the profile page 802 may include a document table 804, which may contain a list of documents 404 included in the employee profile. Accordingly, after the document 404 is moved automatically via the document management portal and/or manually by, for example, an HR representative input to the user profile (process block 308), the employee may view the document 404 in the document table 804. The employee may also access (e.g., view, download, edit, and/or print) the document 404 from the document table 804. Further, the employee may simultaneously download a suitable number of documents 404 from the document table 804 via, for example, a compressed folder. However, in some embodiments, documents 404 moved to the user profile and/or the type of access available to the employee for a document 404 in the document table 804 may be restricted based on a security policy 510 associated with the document 404 and/or the document type 420.

Further, in some embodiments, the employee may securely share the document 404 with an additional user according to a sharing policy, which may be associated with the document 404 via metadata 406. The document 404 may be shared so that the interactions of the additional user with the document 404 are limited. For example, the document 404 may expire (e.g., delete) a set number of days after it is shared with the additional user. In some embodiments, the additional user may be authenticated through a manual user (e.g., HR representative) approval process and/or an automatic verification of the additional user's credentials in the document management portal. Further, the additional user may view, but not edit the document 404, and in such cases, a preview (e.g., limited version) of the document 404, not the document file itself, may be shared with the additional user. Accordingly, the spread of information included within the document 404 may be limited. As such, the employee may apply permissions (e.g., metadata 406) to the document 404 before sending it to the additional user. These permissions may include an expiration date, permissible actions (e.g., view, download, edit, and/or print) that the additional user may perform on the document 404, and/or the like.

Additionally, in some embodiments, the document 404 may be shared and/or securely shared before it is included in the employee profile. In some cases, for example, an HR representative may securely share a document 404 with the employee to complete an operation (e.g., an HR case 422) through the document management portal. As such, the HR representative may share the document 404 with the employee so that the employee may complete (e.g., fill in and/or sign) a portion of the document 404 with an appropriate response before the document 404 is moved into the employee profile. Further, by securely sharing the document 404 with the employee, the HR representative may avoid duplicating (e.g., via email) the document 404 outside the document management portal, and the HR representative may set the document 404 to expire (e.g., be deleted) after a set number of days, which may increase security related to the document 404.

Further, as described above with reference to the type of HR case dictating the set of suitable documents and/or document types 420, a user (e.g., an HR representative) may use the profile page 802 to create a checklist of documents 404 and/or document types 420 to be associated with a user. Accordingly, missing and/or incorrect (e.g., extraneous and/or erroneous) documents 404 and/or document types 420 associated with a user (e.g., profile) may easily be identified.

As mentioned above, an additional suitable action to perform on the document 404 may include purging the document 404 from the document management portal. The process involved with purging the document 404 from the document management portal may depend on several factors (e.g., metadata 406). These factors may include a retention policy 508, a purge authorization, a purge policy, and/or the like. The retention policy 508 associated with the document 404 (e.g., via metadata 406) may dictate the period of time to maintain the document 404 within the document management portal. Accordingly, to determine when (e.g., a date) to purge a document 404, the retention policy 508 associated with the document 404 may be determined. The purge authorization associated with the document 404 (e.g., via metadata 406) may determine whether the document 404 may be purged without receiving an authorization from a user, such as an employee or an HR representative. Further, the purge policy may determine the manner by which the document 404 is purged from the document management portal. In some embodiments, for example, purging the document may involve a suitable combination of deleting the document from the database 108, creating and/or updating a log (e.g., history) of the document, and/or the like.

Figure 9:
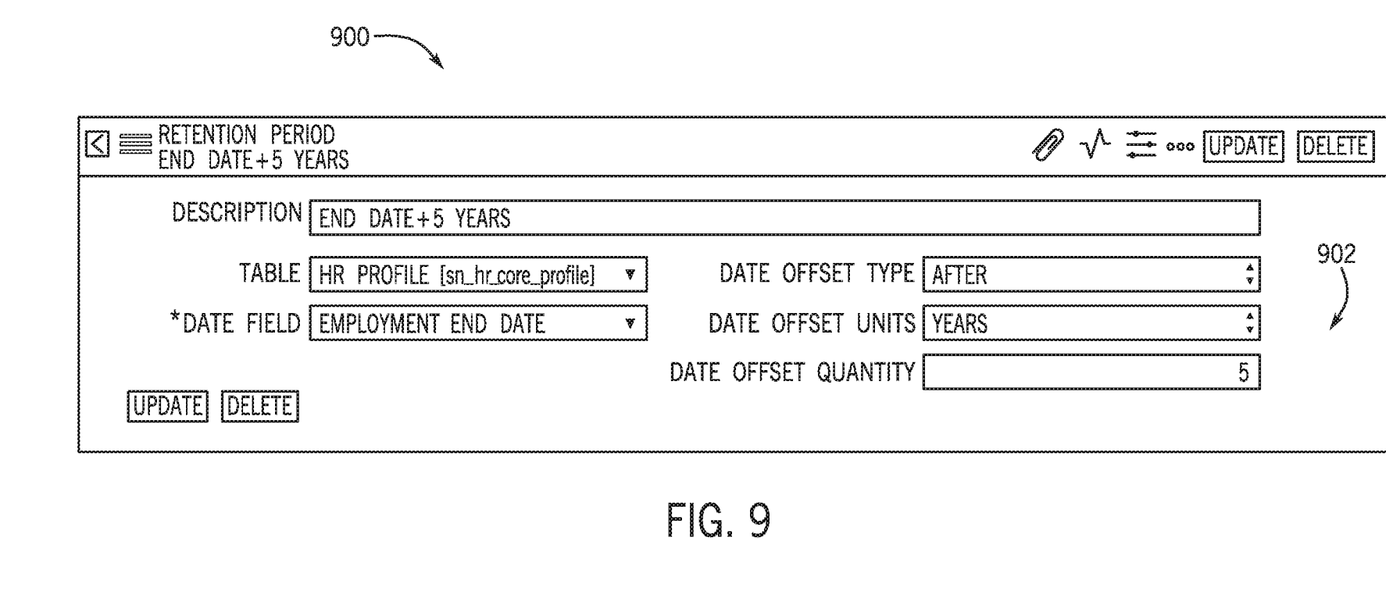
FIG. 9 is a screenshot of a user interface to configure a retention policy, which may be associated with the uploaded document.

Turning to FIG. 9, the retention policy 508 associated with a document 404 may be configured via a retention policy configuration page 902, as illustrated in a screenshot of a user interface 900. In some embodiments, a user may configure the retention policy 508 to be a fixed date or a date dependent on an event. Events may include an employee onboarding, an employee leaving an enterprise, creation of the document, and an update to the document, among other things. As such, a first document 404 may be retained, for example, until the first day of a specified month, while a second document 404 may be retained until five years after an employee leaves an enterprise. Further, while the illustrated embodiment displays fields to configure a date (e.g., retention period) associated with the retention policy 508, the retention policy may additionally or alternatively be configured based on user (e.g., HR) criteria, which may also be configured. Examples of user criteria may include a geographic location associated with a user, a role associated with the user, and/or the like. Accordingly, in some embodiments, the retention period associated with a retention policy 508 for a first document 404 associated with a first user located in North America may be set to a first number of years (e.g., 7 years), while a retention policy 508 associated with a second document 404, having the same document type 420 as the first document 404, associated with a second user located in Europe may be set to a second number of years (e.g., 5 years). Moreover, multiple different retention policies 508, which may be associated with a number of different user criteria and/or metadata 406 (e.g., document type 420), may be associated with a single document 404. As such, in some embodiments, if a conflict exists between the multiple retention policies 508, the retention policy 508 specifying the longest duration to retain the document 404 may be applied to the document 404. In other embodiments, the multiple retention policies 508 may be prioritized based on, for example, a configuration of associated user criteria and/or retention periods, and the retention policy 508 with the highest priority may be applied to the document 404.

A user and/or a computing device 200 may specify the purge authorization associated with the document 404 via an input field associated with a suitable page (e.g., 402, 502, 602, 702, 802, and/or 902). Accordingly, the purge authorization may be included as metadata 406 associated directly with the document 404 and/or as metadata 406 associated with the document 404 via inherited metadata 406. Further, in some embodiments, the user and/or computing device 200 may set the purge authorization of a document 404 to "none", "required", or "notify only".

Before purging a document 404 with a purge authorization set to "required," a user may approve the purge. As such, a notification to inform the user of an upcoming purge of a document 404 may be generated. The generated notification may be sent to the user via, for example, a computing device 200. In such embodiments, the computing device 200 may provide an indication that the notification was received. The indication may be a ring tone, a vibration pattern, a visualization, a reminder, a task, an audio message, or the like. In some embodiments, the notification may activate an application or program stored on the computing device 200, despite the computing device 200 being in a sleep or low power mode, to increase the likelihood that a user will take note of the notification. Further, the notification may be sent via e-mail, text message, application notifications, and/or any other suitable messaging services platform.

After a response approving the purge is received from the user, the document 404 may be purged. If, a response (e.g., input) declining the purge is received from the user, an input regarding an updated retention policy of the document may be received before purging the document 404 at a later date or retaining the document indefinitely. Additionally, or alternatively, in some embodiments, after a response declining the purge is received from the user, the purge may be postponed until the purge is manually approved by a suitable user and/or until an additional request for approval, which may be submitted by an authorized (e.g., administrative) user, is approved. Further, in such cases, the retention policy of the document may remain unchanged but may be ignored in terms of the purge process until the purge is approved. In any case, the purge may be postponed until a response is received from the user.

Purging a document 404 with its purge authorization set to "notify" may allow a user to be notified that the document 404 is scheduled to be purged and may allow the document 404 to be purged without waiting for a response from the user to do so. Accordingly, a notification to inform the user of an upcoming purge of a document 404 may be generated. The generated notification may be sent to the user via, for example, a computing device 200, and the document 404 may be purged on a suitable date, according to the retention policy of the document, regardless of having not received a response from the user. If, however, a response (e.g., input) is received from the user to postpone the purge, the purge may be delayed accordingly. That is, while a document with its purge authorization set to "notify" may be purged without a response from the user, the user may still intervene with a suitable response (e.g., input) to prevent and/or postpone the purge.

With respect to documents 404 with purge authorizations set to "required" and/or "notify," the user and/or a computing device 200 may additionally set a notification interval (e.g., metadata 406) associated with a document 404. The notification interval may determine a frequency with which and/or how soon prior to the purge date included in the retention policy the user may receive the notification. Accordingly, a user may receive a notification one month prior to a documents 404 retention policy date, for example, and in the case of a "required" purge authorization, the user may receive follow-up notifications regarding the document each day after the notification is received until a response is received.

Purging a document 404 with its purge authorization set to none may result in the document 404 being removed from the document management portal without sending a notification of this purge to a user. Accordingly, the document 404 may be purged regardless of whether an input (e.g., a response) from the user regarding the purge is received.

The purge policy may dictate what happens to a document 404 upon purging. In some embodiments, for example, to purge the document 404, the document 404, any copies of the document 404, and/or any references to the document 404 may be deleted from the database 108. In other cases, the document 404 may be deleted from the database 108 but a record (e.g., an audit trail) of the document 404 and/or any references to it may be maintained within the database 108 and/or within memory 206. The record may include information, such as a log of users who interacted with the document 404, modifications made to the document 404, downloads of the document 404, and/or the like, related to the document 404 and/or metadata 406 associated with the document 404. Further, in some embodiments the type of information captured may be configured via the document management portal. Additionally or alternatively, the document 404 may be moved to an internal and/or an external archive, such as a different database. Further, a user and/or the computing device 200 may configure the purge policy associated with a document (e.g., as metadata 406). Accordingly, what happens to the document 404 and/or the information retained with respect to the document 404 upon its purging may be updated by the user and/or the computing device 200.

Figure 10:
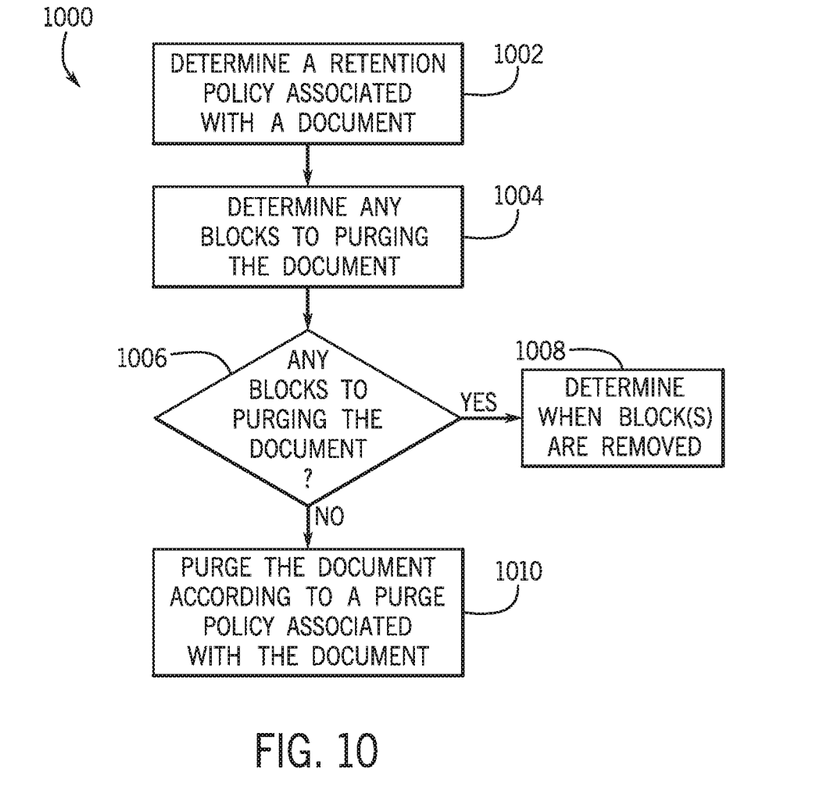
FIG. 10 is a flow diagram of a method to purge the uploaded document, in accordance with an embodiment.

With the foregoing in mind, FIG. 10 illustrates a flow chart of a method 1000 for purging a document 404 from the document management portal, in accordance with embodiments described herein. Although the following description of the method 1000 is described in a particular order, which represents a particular embodiment, it should be noted that the method 1000 may be performed in any suitable order. Further, certain steps may be skipped altogether, and additional steps may be included in the method 1000. Moreover, the method 1000 may be performed on the one or more processors 202 of one or more computing devices 200 of the client device 102, the platform 104, the MID server 126, or any suitable combination.

The method 1000 may be initiated by a number of suitable events. In some embodiments, the method 1000 may be initiated in response to the creation of and/or update to a document 404 in the document management portal. Accordingly, the method 1000 may be initiated in response to a creation of, an update to, and/or a deletion of a retention policy 508 associated with the document 404. The method 1000 may additionally or alternatively be initiated in response to receiving an input to close and/or closing an operation, such as an HR case 422, and/or in response to a change to a user (e.g., profile), who may be associated with a document 404 and may have a retention policy 508 associated with documents 404 included in his/her profile. Further, the method 1000 may run periodically (e.g., once a week, once a month, and/or the like) on a document 404 or a set of documents 404. In such cases, the periodicity with which the method 1000 runs may be configured, via, for example, the document management portal.

In any case, once the method 1000 has been initialized, a retention policy 508 associated with a document 404 may be determined (process block 1002). To do so, the metadata 406 associated with the document 404 may be accessed to determine the retention policy 508 (e.g., purge date) associated with the document.

Whether any blocks to purging the document 404 exist may then be determined (process block 1004). Blocks to purging the document 404 (e.g., purge holds) may include receiving no response from a user for when the document 404 has a "required" purge authorization in place and/or receiving a response from the user to block and/or postpone purging the document (e.g., an approval hold). Further, in some embodiments, the metadata 406 associated with a document 404 may include a legal hold and/or an additional hold, which may manually be assigned to a document 404. A user and/or a computing device 200 may set the legal hold and/or an additional hold on the document 404 to specify a postponement of purging the document 404 until such a hold is removed. For example, a user may specify a legal hold on a document 404 in order to ensure the document 404 is maintained in the document management system during a litigation involving the document 404. Additionally or alternatively, a document 404 may inherit a legal hold and/or an additional hold based on other metadata 406 associated with the document 404. For example, a document 404 with an associated document type 420 and/or user (e.g., profile) with a legal and/or an additional hold may inherit the legal and/or additional hold associated with this metadata 406.

Accordingly, if there are any blocks to purging the document (decision block 1006), the method 1000 may proceed to determine when the blocks are removed (process block 1008). As such, the one or more blocks to purging the document may be monitored to determine when the blocks are resolved and/or an input via the computing device 200 and/or from the user may be received when the blocks are resolved. Accordingly, the moment a response from the user approving the purging process and/or a legal and/or additional hold on the document 404 is removed may be determined.

After all blocks to purging the document 404 are removed (process block 1008), or if no blocks to purging the document were identified (decision block 1006), the document may be purged according to a purge policy associated with the document 404. Accordingly, the metadata 406 associated with the document 404 may be accessed to determine the purge policy associated with the document 404. Then, as described herein, the document 404 and/or any copies of the document 404 may be deleted from the database 108, a record of the document 404 and its history may be maintained, the document 404 may be moved to an archive, and/or the like, according to the purge policy associated with the document 404.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
one or more databases, wherein the one or more databases comprise information related to a plurality of profiles;
a processor configured to execute computer-executable instructions which, when executed cause the processor to:
receive a document associated with an operation, wherein the document comprises metadata, wherein the metadata comprises information related to one or more of the operation, a profile of the plurality of profiles, or the document;
store the document in the one or more databases;
in response to receiving an input to close the operation, based at least in part on the metadata, associate the document with the profile, wherein associating the document with the profile comprises updating the information related to the plurality of profiles; and
after associating the document with the profile, share a limited version of the document remotely from the profile, wherein the limited version of the document is configured to, based at least in part on the metadata, do one or both of expire after a predefined amount of time has elapsed or restrict functionalities of the document.

2. The system of claim 1, wherein the computer-executable instructions, when executed by the processor, cause the processor to purge the document from the one or more databases after an additional predefined amount of time has elapsed.

3. The system of claim 2, wherein purging the document from the one or more databases comprises one or more of deleting the document, sending the document to an archive, or updating a log related to a history of the document.

4. The system of claim 2, wherein the computer-executable instructions, when executed by the processor, cause the processor to identify, based at least in part on the metadata, an absence of a purge hold associated with the document prior to purging the document from the one or more databases.

5. The system of claim 4, wherein the purge hold comprises one or both of a legal hold or an approval hold.

6. The system of claim 2, wherein the computer-executable instructions, when executed by the processor, cause the processor to:
in response to identifying, based at least in part on the metadata, a purge hold associated with the document, postpone purging the document from the one or more databases, wherein postponing comprises increasing the predefined amount of time.

7. The system of claim 2, wherein the computer-executable instructions, when executed by the processor, cause the processor to determine the predefined amount of time based at least in part on the metadata.

8. The system of claim 1, wherein the metadata comprises one or more of a document type, a retention policy, a purge policy, a purge authorization, or user access permissions.

9. The system of claim 1, wherein the operation comprises additional metadata, wherein the metadata is configured to inherit the additional metadata.

10. The system of claim 1, wherein the computer-executable instructions, when executed by the processor, cause the processor to update the metadata in response to one or both of receiving the input or receiving an additional input, wherein the additional input is different from the input.

11. The system of claim 1, wherein the profile comprises one or both of a folder, wherein the folder is configured to store one or both of the document associated with the profile or information related to the document associated with the profile.

12. A non-transitory, computer readable medium comprising instructions, wherein the instructions are configured to be executed by a processor to perform operations comprising:
    receive a document associated with an operation, wherein the document comprises metadata;
    store the document in one or more databases, wherein the one or more databases comprise information related to a plurality of profiles;
    in response to receiving an input to close the operation, based at least in part on the metadata, associate the document with a profile in the plurality of profiles, wherein associating the document with the profile comprises updating the information related to the plurality of profiles; and
    after associating the document with the profile, share a limited version of the document remotely from the profile, wherein the limited version of the document is configured to, based at least in part on the metadata, do one or both of expire after a predefined amount of time has elapsed or restrict functionalities of the document.

13. The non-transitory, computer readable medium of claim 12, wherein one or both of an additional input or additional metadata associated with the operation comprise the metadata.

14. The non-transitory, computer readable medium of claim 12, wherein the operations comprise generating the document in response to creation of the operation.

15. The non-transitory, computer readable medium of claim 12, wherein the operations comprise purging the document from the one or more databases after an additional predefined amount of time has elapsed.

16. The non-transitory, computer readable medium of claim 15, wherein the operations comprise receiving a response approving purging the document prior to purging the document from the one or more databases.

17. The non-transitory, computer readable medium of claim 15, wherein the operations comprise outputting a notification to a computing device prior to purging the document from the one or more databases, wherein the notification comprises information related to purging the document.

18. A method for managing a document, comprising:
    receiving a document associated with an operation;
    storing the document in one or more databases, wherein the one or more databases comprise information related to a plurality of profiles, wherein a profile of the plurality of profiles is associated with the operation;
    determining metadata to associate with the document based at least in part on one or more of the operation, the profile, or an input related to the document;
    in response to receiving an additional input to close the operation, based at least in part on the metadata, associate the document with the profile, wherein associating the document with the profile comprises updating the information related to the plurality of profiles; and
    after associating the document with the profile, share a limited version of the document remotely from the profile, wherein the limited version of the document is configured to, based at least in part on the metadata, do one or both of expire after a predefined amount of time has elapsed or restrict functionalities of the document.

19. The method of claim 18, comprising purging the document from the one or more databases after an additional predefined amount of time has elapsed.

* * * * *